United States Patent [19]

Labrum

[11] 4,408,873
[45] Oct. 11, 1983

[54] COLOR CORRECTION ADAPTER FOR PHOTOGRAPHIC ENLARGERS

[76] Inventor: Ervin D. Labrum, 15828 4th Ave., SW., Seattle, Wash. 98166

[21] Appl. No.: 214,194

[22] Filed: Dec. 8, 1980

[51] Int. Cl.³ .................... G03B 27/73; G03B 27/74
[52] U.S. Cl. .................................. 355/36; 355/38; 355/77
[58] Field of Search ............... 355/32, 35, 36, 37, 355/38, 68, 71, 77; 350/313

[56] References Cited

U.S. PATENT DOCUMENTS

| | | | |
|---|---|---|---|
| 2,518,947 | 8/1950 | Simmon | 355/35 |
| 3,229,569 | 1/1966 | Frost et al. | 355/38 |
| 3,241,435 | 3/1966 | Craig et al. | 355/38 |
| 3,292,488 | 12/1966 | Griffith | 355/38 |
| 3,312,144 | 4/1967 | Neale | 355/38 |
| 3,322,025 | 5/1967 | Dauser | 355/35 |
| 3,408,142 | 10/1968 | Hunt et al. | 355/38 |
| 3,458,254 | 7/1969 | Aston | 355/35 |
| 3,504,971 | 4/1970 | McCune | 355/35 |
| 3,575,508 | 4/1971 | Fergg et al. | 355/88 |
| 3,575,702 | 4/1971 | Huber | 355/77 |
| 3,582,325 | 5/1971 | Paulus | 355/77 |
| 3,601,485 | 8/1971 | Barbieri | 355/38 |
| 3,684,371 | 8/1972 | Weisglass et al. | 355/35 |
| 3,685,901 | 8/1972 | Crete | 355/38 |
| 3,797,933 | 3/1974 | Sable | 355/35 |
| 3,880,519 | 4/1975 | Barbieri | 355/36 |
| 3,883,243 | 5/1975 | Weisglass et al. | 355/35 |
| 3,927,938 | 12/1975 | Seigenji | 355/38 |
| 3,982,825 | 9/1976 | Mitchell | 350/313 |
| 4,129,372 | 12/1978 | Allgeier | 355/1 |
| 4,140,391 | 2/1979 | Laciak et al. | 355/38 |
| 4,143,966 | 3/1979 | Gandini | 355/35 |
| 4,172,659 | 10/1979 | Laska | 355/68 |
| 4,175,852 | 11/1979 | Baert | 355/35 |
| 4,176,946 | 12/1979 | Takahashi | 355/38 |
| 4,192,605 | 3/1980 | Fergg et al. | 355/38 |

FOREIGN PATENT DOCUMENTS

871554  3/1953  Fed. Rep. of Germany ........ 355/38

*Primary Examiner*—Alan Mathews
*Attorney, Agent, or Firm*—Delbert J. Barnard

[57] ABSTRACT

Subtractive filters are moved into and outfrom the light path between a lamp and a supported color transparency in a color enlarger to provide three separate exposures for the colors red, green and blue. Operator setable means provides an exposure time for each color exposure based on the color density of a standardized transparency. Balance circuit adjusts the exposure time for each color exposure to compensate for differences in color density between the standardized transparency and a transparency from which a color print is to be made. The balance circuit includes a light intensity sensor between the transparency and the lens. Magenta and yellow filters are moved together into the light path to produce the color red. Yellow and cyan filters produce the color green. Cyan and magenta filters produce the color blue. At the end of the red exposure the cyan filter is moved back into the white light path before the yellow filter is withdrawn. At the end of the green exposure the yellow and cyan filters are delayed in the white light path until all white light has disappeared. A portion of the magenta filter is moved into the light path during the green exposure and a portion of the yellow filter is moved into the light path during the green exposure. This shutters off some of the light, permitting an increase in the exposure time for the colors green and blue.

24 Claims, 10 Drawing Figures

Fig. 9

COLOR CORRECTION ADAPTER FOR PHOTOGRAPHIC ENLARGERS

BACKGROUND OF THE INVENTION

1. Field Of The Invention

This invention relates to projection printing of multicolor pictures from transparencies. More particularly, it relates to an attachment for a standard type photographic enlarger, including a plurality of filters and control means for sequencing the filters into and outfrom the light path of the enlarger, to provide three separate exposures in sequence for the colors red, green and blue, and means for establishing the length of each exposure as a function of the density of the transparency in the enlarger.

2. Description Of The Prior Art

The basic technique of producing color photographs by projection printing is well known and need not be described in detail.

There are two common ways of controlling color balance and exposure in a projection printing process. The first involves making a single exposure by use of a white light that has been modified by substractive filters. The second involves making a sequence of three separate carefully calculated exposures for the three basic colors red, green and blue.

An advantage of the single exposure technique is that the total exposure time is relatively short since all three of the color sensitive emulsions on the photographic paper are exposed at the same time. This provides for high volume production but experience has shown that it is very difficult to control color balance. The three filters are inserted only partially into the path of the white light. The portion of the white light that is modified in this manner is mixed in a mixing chamber with the remaining unmodified white light and then the mixture is directed through the lens to the photographic paper. Most enlargers using this type system include a manual setting for each filter by which the operator controls the area of each filter which is placed in the path of the white light. It is quite difficult to accurately set the filters in this manner. It usually involves a time and material consuming trial and error process for each negative. Negative color analizers are available but their use is also time consuming and the results are not always good because it is not always possible to have a known reference area from which to take a color density reading. Also, it is difficult to relate a reading to a specific enlarger, or printer. Some enlargers are available which include automatic controls which perform well but they are very expensive. A further problem of the single exposure technique is that accurate settings become more difficult as the bulb ages and the quantity and quality of the light decreases.

Exposure times of long duration are customary and preferred in the art of making large photographic enlargements. Long duration exposure times and inexpensive and accurate automatic control are possible if three separate exposures are employed, one for each of the basic colors red, green and blue.

A principal object of the present invention is to provide a relatively simple, inexpensive, but workable automatic control system for an enlarger, based on the use of three separate exposures for the colors red, green and blue.

SUMMARY OF THE INVENTION

The exposure control system of the present invention essentially comprises three separate filters which are mounted to be independently movable into and outfrom the light path between a lamp and a supported color transparency in a color enlarger. Control means are provided for sequencing the filters into and outfrom the light path, to provide three separate exposures in sequence for the three basic colors red, green and blue, but not necessarily in that order. The control means includes means for providing an exposure time for each color exposure that is based on the color density of the standardized transparency, and balance means for adjusting the exposure time for each color exposure to compensate for differences in color density between the standardized transparency and a transparency in the color enlarger from which a color print is to be made.

According to one aspect of the invention, the balance means comprises a color density analizer means including sensor means in the enlarger between the transparency and the lens, for measuring during each exposure the density of color passing through the negative. The color density analizer means also includes means responsive to a difference in color density between the standardized transparency and the transparency in the enlarger, for automatically adjusting the time period of each exposure, to improve color balance.

According to another aspect of the invention, the three filters are mounted on a carrier and such carrier and the filters are adapted to be set down into the open top of the head of a standard enlarger of a type having a horizontal directed lamp within the head and a reflector within the head which is positioned to receive light from the lamp and direct it vertically downwardly through first a transparency holder and then a lens.

The mechanism for moving the filters into and outfrom the light path may comprise an electrical solenoid for each filter and mechanical linkage interconnected between the solenoid and a carrier for the associated filter.

According to another aspect of the invention, substractive filters are used and the filters are employed in pairs to produce the desired colors. Also, means are provided for causing a partial movemment of the third filter into the light path during the exposure periods for the colors green and blue. The portion of the white light path which is subjected to all three filter is totally blocked. The remaining portion of the light path, which is subjected to only two filters, becomes colored either green or blue, depending on the particular filter combination that is in use. The advantage of this partial "shuttering" effect is that it decreases the intensity of the total light and permits a longer exposure time for the colors green and blue which is desirable.

Another aspect of the invention involves a method of improving color balance in a color photography projection printing operation by locating unfilted sensor means adjacent the enlarger lens, between the lens and the transparency carrier, and then using a color density signal obtained by such sensor means to adjust the exposure time.

These and other features, objects, and advantages of the present invention are discussed below in connection with, and will be apparent from, the preferred embodiment.

BRIEF DESCRIPTION OF THE DRAWING FIGURES

Referring to the drawing wherein like reference characters designate like parts throughout the several views.

DESCRIPTION OF THE PREFERRED EMBODIMENT

Figures 1, 2:
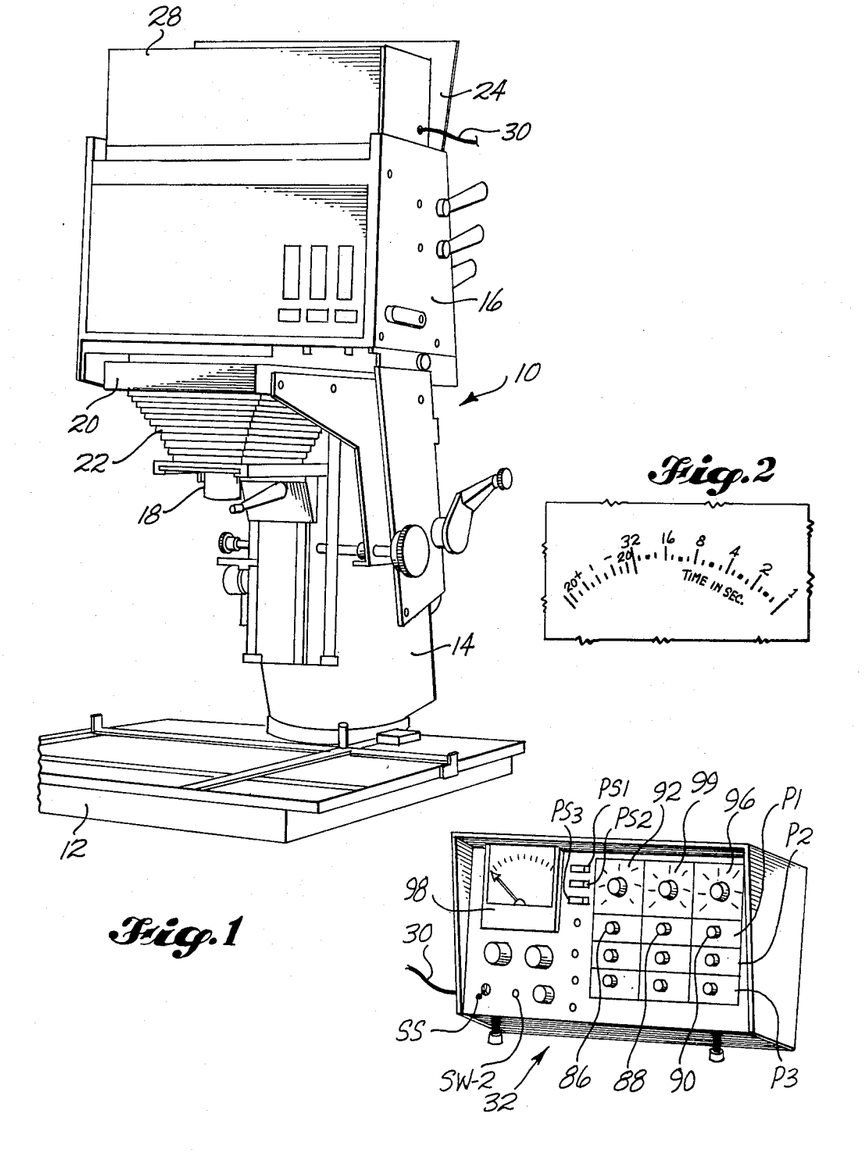
FIG. 1 is a pictorial view of a photographic color enlarger and an embodiment of the present invention.
FIG. 2 is an enlarged scale view of the control console scale.

FIG. 1 shows a standard color enlarger 10 having an easel 12, a support column or post 14, a head structure 16, a lens 18 and a transparency carrier 20. The usual mechanism is provided for moving the head structure, lens, etc. up and down the column 14, and for fine adjusting the lens in position relative to the easel, including a bellows 22.

The particular enlarger 10 that is illustrated includes a hinged lid 24 at its top. The mechanism of the present invention comprises a filter assembly 26 (FIGS. 2-5) which replaces the filter system built into the enlarger 10. In accordance with one aspect of the invention, the new filter assembly 26 is housed within a housing 28 which need only be set down into the opening produced on top of the enlarger head 16 when the lid 24 is opened. An electrical cord 30, shown broken away between its two ends in FIG. 1, connects the control portion of the new filter assembly 26 with a control system housed within a console 32. As shown, console 32 is relatively small in size so that it can be placed next to the enlarger 10 on a common support surface.

Figures 3, 5:
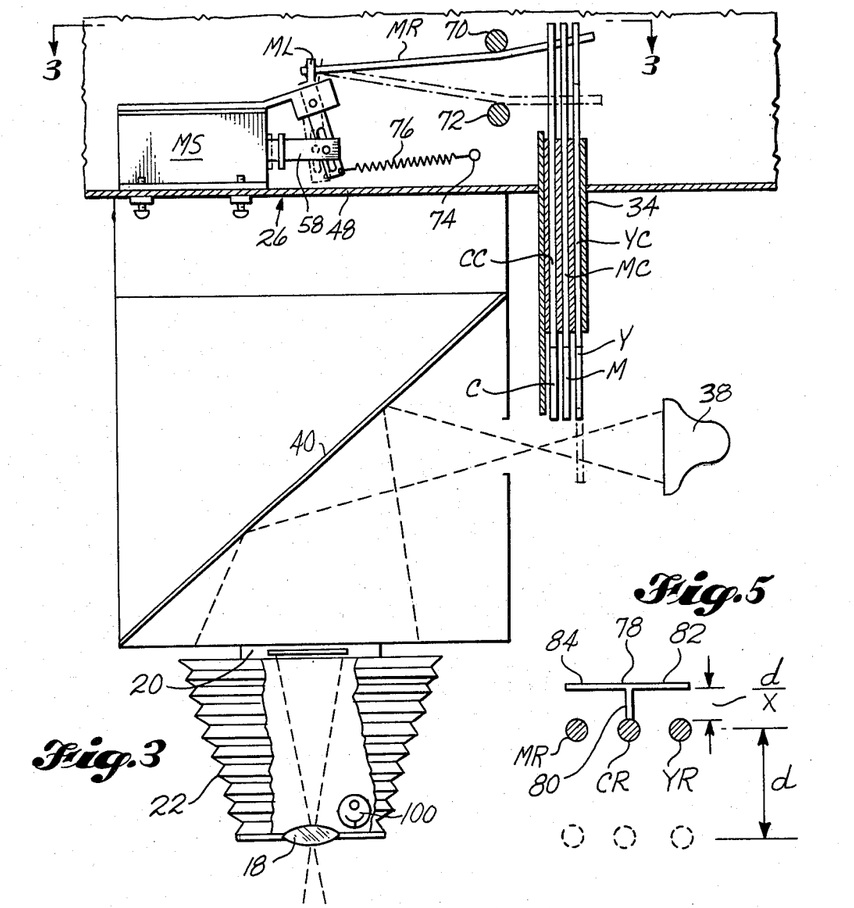
FIG. 3 is a vertical sectional view taken through the head of the enlarger and through the filter assembly portion of the illustrated embodiment, with some parts being presented rather diagramatically.
FIG. 5 is a cross-sectional view taken substantially along line 5—5 of FIG. 4.
Figure 4:
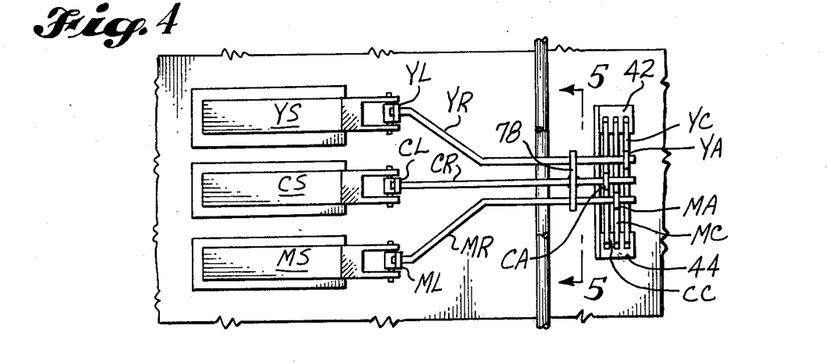
FIG. 4 is a top plan view of the filter assembly, taken substantially along line 4—4 of FIG. 3.

Referring now to FIG. 3, the filter assembly 26 comprises three different filters Y, M, C carried at the lower ends of filter carriers YC, MC, CC which are mounted for vertical translation within a guide structure 34. Filter assembly 26 further includes actuator mechanism for moving the filters Y M C into and outfrom a light path 36 established by a lamp 38 housed within the enlarger head 16.

In the illustrated embodiment the reflector for the lamp 38 is horizontally directed towards a diagonal mirror 40 which is also housed within the enlarger head 16. As illustrated, light rays from the lamp 38 the mirror 40 and are reflected by it downwardly through either a negative or positive supported with the transparency carrier 20. The illuminated transparency becomes the object for lens 18 which provides an enlarged image, corresponding to such object, on photographic paper positioned on top of the easel 12, in a manner well known in the art.

The guide structure 34 for the filter carriers YC, MC, CC comprises a pair of vertically extending, parallel channel members 42, 44 which may be interconnected by a plate 46. Channel members 42, 44 are provided with slideway slots for receiving edge portions of the filter carriers.

Each filter carrier YC, MC, CC includes an upwardly projecting arm YA, MA, CA. Each arm YA, MA, CA, includes an aperture at its upper end in which an end portion of a related control rod YR, MR, CR is received. The control rods YR, MR, CR are juxtaposed above the floor 48 of housing 28. Each extends from its point of connection with a filter arm YA, MA, CA to a point of interconnection with the upper end of a lever YL, CL, ML. Lever YL, CL, ML are mounted for pivotal movement about a common axis which extends transversely of the control rods YR, CR, MR by means of pivot pins 50. Pins 50 are mounted at their ends onto side portions of yoke structures 52. Each yoke structure 52 is mounted atop a solenoid housing 54 by means including an integral mounting arm 56. Arms 56 are secured to the tops of the solenoid housings 54 in any suitable fashion, with the yoke structures 52 positioned over the solenoid rods.

Since all three lever assemblies are alike, only one will be described in detail. The lever assembly associated with solenoid MS and control rod MR has been chosen because it is quite clearly shown in FIGS. 3 and 6.

Figure 6:
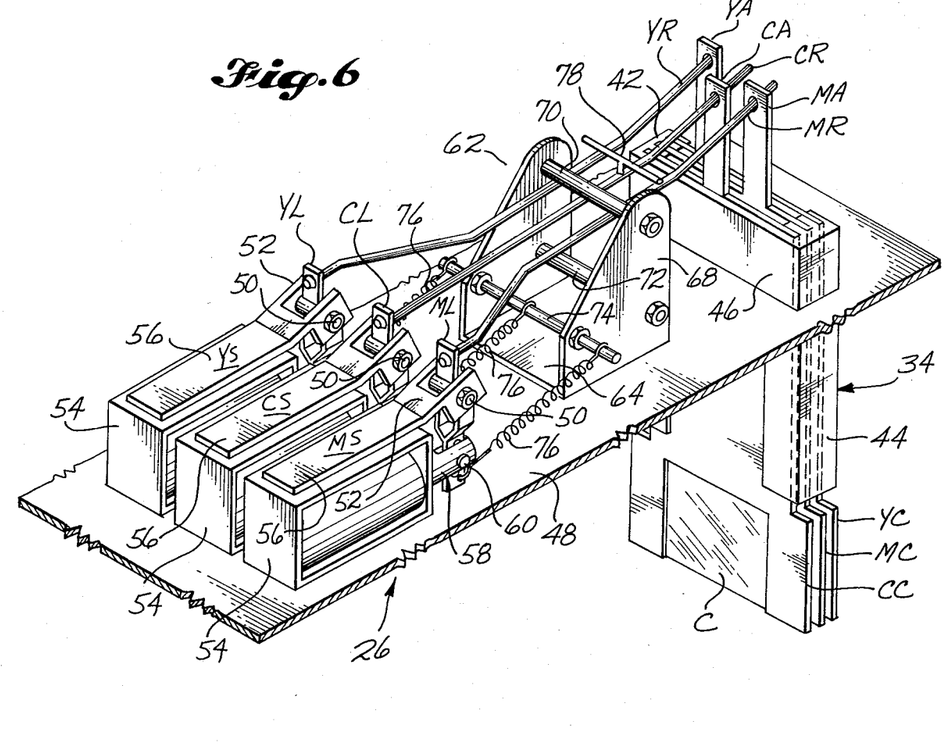
FIG. 6 is a pictorial view of the filter assembly.

As described above, the lever ML associated with solenoid MS includes an upper portion projecting upwardly from pivot pin 60 to a point of connection with the end of control rod MR opposite filter carrier arm. It also includes a lower portion depending from pivot pin 50 down to and through a slot formed in the free end of solenoid rod 58. A cross pin 60 extends through the side portions of rod 58 and the lower portion of lever ML, forming a pivotal connection between rod 58 and lever ML.

A bracket 62 is positioned between the solenoid/lever assemblies and the filter carrier positioning arms YA, CA, MA. Bracket 62 includes a base 64, secured to housing bottom 48, and a pair of upstanding side members 66, 68. Upper and lower bolt-like rod members 70, 72 extend between the side members 66, 68 and function as upper and lower stops, defining the end positions of the filter carriers YC, MC, CC.

A mounting rod 74 also extends between the bracket side members 66, 68, and outwardly of them also, to provide a support for the fixed ends of return springs 76. The opposite ends of the springs 76 are connected to the lower ends of the levers YL, ML, CL in their extent below the solenoid rods 58.

According to one aspect of the invention, control rod CR may be equipped with a T bar 78, having a support stem portion 80 attached to it and a pair of oppositely projecting push arms 82, 84. As best shown in FIG. 5, push arm 82 extends over a portion of control rod YR and push arm 84 extends over a portion of control rod MR. In FIGS. 3 and 5 the upper and lower positions of the control rods YR, MR, CR, established by the cross members 70, 72 are shown by solid and broken lines, respectively. The distance between these two positions is labeled d. The distance between the push arms 82, 84 and the control rods YR, MR is labeled d/x, indicating that this distance is a fractional portion of the distance d. The exact distance d/x is a matter of design and in the preferred embodiment is a distance which will result in push arm movement of one or the other of filters Y, M about half way into the light path 36 in response to solenoid movement of filter C all of the way into light path 36.

The mechanical operation of filter assembly 26 will now be described. The solenoids YS, CS, MS, and the associated control rod and filter support structures, constitute the mechanical means for sequencing the filters Y, M, C into and outfrom the light path 36. In the illustrated embodiment subtractive filters Y, M, C are used together with a white light from lamp 38 to produce the three basic colors red, green and blue.

As best shown by FIG. 3, when the solenoids YS, CS, MS are de-energized, the springs 76 operate to hold the filters Y, M, C in an up position, totally out of the light path 36. Enerization of any one of the solenoid YS, CS, Ms will cause the energized solenoid to pull the lower portion of the particular lever to which its rod 58 is attached towards the solenoid. This in turn causes the upper end of such lever to be swung downwardly away from the solenoid, carrying with it its control rod. The control rod is moved from a position of rest against the upper stop 70, the position in which it is held by the spring 76 when the solenoid is not energized, down to position against the lower stop 72. As the rod moves it pushes down on its control arm, causing a downward movement of the filter carrier of which such control arm is a part, placing the particular filter that is at the lower end of such carrier completely into the light path.

Referring to FIG. 5, solenoid movement of control rod CR from its upper most position against stop 70 down to its lower most position against stop 72 will also result in a partial movement of a control rod MR or YR, due to the presence of push member 78. The other of these control rods MR, YR is already down against stop 72, by solenoid action, because at least two filters are moved by solenoid action at all times. Solenoid movement of control rod CR will move it a distance d. For the first part of this movement it alone will move. However, after the push arms 82, 84 have moved the distance d/x, they will contact a control rods MR or YR, which ever is up, and move it with control rod CR during the remaining movement of control rod CR. The control rod MR or YR will move a distance d minus d/x. In a typical embodiment, this distance is approximately one half d. In other words, in such embodiment the filter M or Y will be moved half way into the light path 36 in response to a full movement of filter C into the light path 36.

Filter Y is a yellow filter. Filter M is a magenta color filter. Filter C is a cyan color filter. Movement of the magenta and yellow filters M, Y together into the white light path will produce the color red. Movement of the yellow and cyan filters Y, C together into the light path will produce the color green. Movement of the cyan and magenta filters C, M into the light path will produce the color blue. Movement of all three filters Y, M, C into the light path will result in a complete subtraction of light, producing a shutter effect. Movement of any two filters together into the light path to produce a desired color, accompanied by a partial movement of the third filter into the light path, will still produce the desired color but will decrease the quantity of light delivered to the mirror 40 and from the mirror 40 to the lens 18. The benefit of doing this will be explained below.

Referring once again to FIG. 1, the control panel on console 32 comprises three sets of control dials P1, P2, P3, each set comprising three dials, one for each of the three colors red, green, blue. Each set of three dials constitutes a separate program for the control mechanism. This allows the user to program in a particular transparency and/or a particular type of paper on one program (e.g. P1). Then, if he desires to change the transparency and/or the paper, he can make the time settings for the new combination on the second program P2, without disturbing the time settings on program P1. This would enable him to come back and print some more prints using the first combination of transparency and paper, etc. at a later time. It should be evident, the presence of a third program P3 allows the user to store two sets of instructions while operating the machine on a third set. Program selection is by pushing one of the program selector buttons PS1, PS2, PS3.

Since the operation of all three programs P1, P2, P3 is the same, only the operation of program P1 will be described.

The basic sequence of operation of the illustrated embodiment will now be described:

Firstly, the operator turns on set-up switch SS. Then on a selected program he dials in an exposure time for each color red, green, blue based on a standardized or reference transparency. This may be a commercially available standardized transparency, known as a "Shirley" (a trademark of the Eastman Kodak Company), or it may be one of the operator's own transparencies with which he has found the proper exposure time by a trial and error method. Dial 86 is used for dialing in a time exposure for the color red. Dial 88 is used for dialing in an exposure time for the color green. Dial 90 is used for dialing in an exposure time for the color blue. Dials 92, 94, 96 are what may be termed fine tuning dials. These dials 92, 94, 96 are usable with all three programs P1, P2, P3. Dial 92 is for the color red, dial 94 is for the color green and dial 96 is for the color blue. As will hereinafter be described in connection with FIG. 8, the dials 86, 88, 90, 92, 94, 96 control variable resistors which serve to change exposure time by changing the voltage of a signal delivered to a timer mechanism.

After dialing in exposure time for each color based on a standardized transparency, the operator selects a transparency from which he desire to make a photographic print and loads it into the transparency carrier 20. Then, he moves the enlarger head 16 vertically along post 14, to roughly adjust for size. Then he makes a final adjustment for size and puts the image into proper focus by movement of the lens carrier.

When the power to the control mechanism is turned on, and the sequence is started, the system will manipulate the three filters Y, M, C to sequencially produce the three basic colors, in the order of red, green and then blue, and will turn on the lamp 38 for each color for a length of time determined by the exposure period setting for each color. By way of typical and therefore nonlimitive example, the operator may turn dial 86 to make a four second setting for the color red, may turn dial 88 to make a three second setting for the color green and may turn dial 90 to make a two second setting for the color blue. Dials 92, 94, 96 provide a way of fine tuning the time settings.

After the image has been put into proper focus, the operator places a light meter LM (FIG. 7) on the easel in an average density selected area. Said light meter LM sensor is electronicly connected to the density scale (left side) on display 98. The f stop adjustment on the lens 18 is used to bring the light density into a proper relationship to the time setting. Usually, when the light meter is place on the easel with the lens set at a random f stop, the needle is to one side or the other of the zero or null position on the density scale. The operator watches the density scale while rotating the f stop control for the lens 18. He rotates the lens in the direction required and for the distance required to move the needle to the null position.

Figure 7:
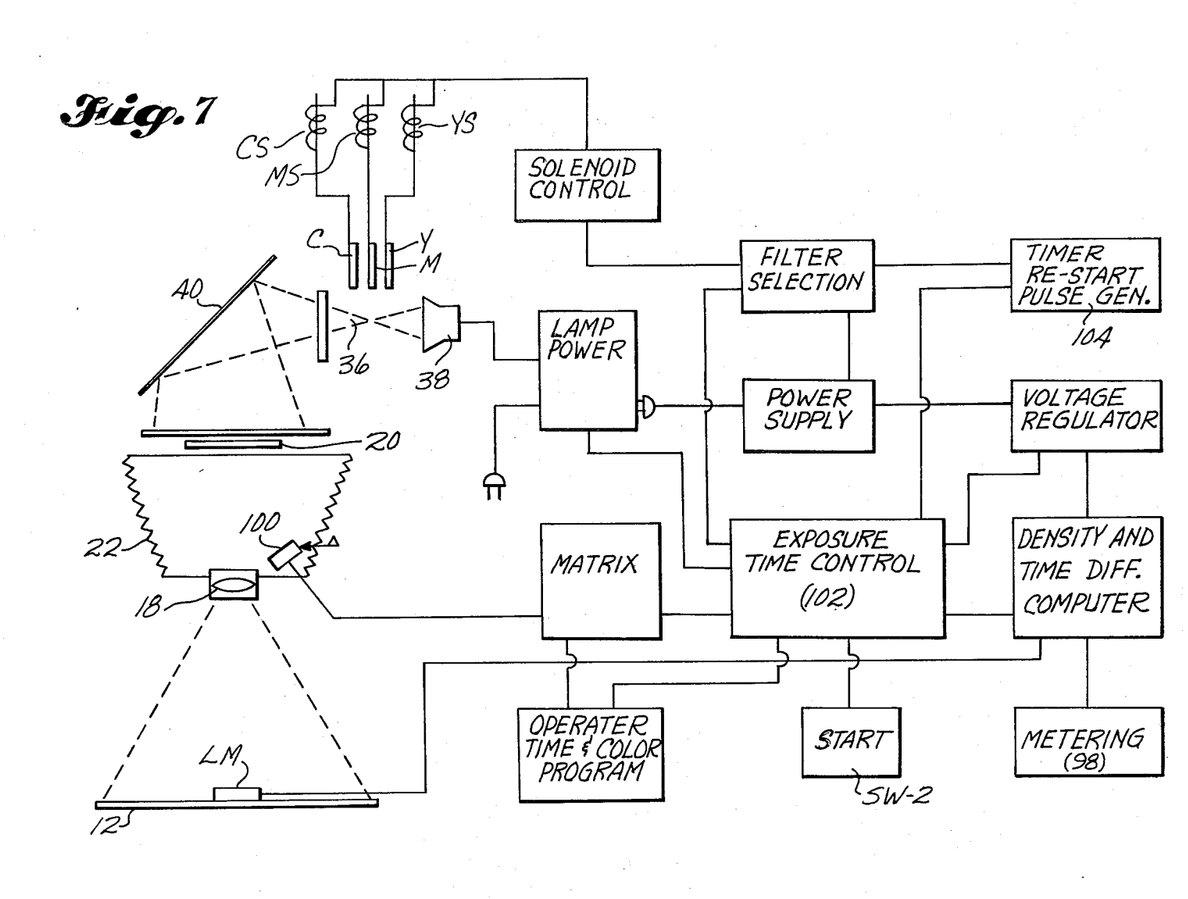
FIG. 7 is a general schematic diagram of a system constructed in accordance with the present invention, including a box diagram showing of the control circuitry.

As shown by FIG. 7, an unfiltered sensor 100 is positioned within the bellows 22, between the supported transparency and the lens 18, closely adjacent to the lens 18. Sensor 100 measures the intensity (or lumens) of color passing through the transparency. Sensor 100 is a part of a color density analyzer which produces a signal based on the difference in density between the transparency in carrier 20 and a standardized transparency and such signal is used to cause a change in the exposure time for the color involved.

The sequencing of the filters Y, M, C will now be described in reference to the control circuit diagrams. At the start of the exposure cycle the magenta and yellow filters M, Y are moved together into the path of light from lamp 38 and the lamp 38 is turned on. This produces the color red. The unfiltered sensor 100 measures the intensity of the color red which passes through the transparency and triggers adjustment of the exposure time.

Immediately at the end of the adjusted exposure time for the color red, the cyan filter C drops into place so that all three filters are in the white light path 36. This results in a complete subtraction of light. Then, the magenta filter M is moved out of the light path, with the yellow and cyan filters Y,C remaining, to produce the color green. The sensor 100 measures the intensity of the color green passing through the transparency and produces a signal which triggers a change in the exposure time for the color green. At the end of the green exposure time the magenta filter M drops back into the light path 36 to again block off all light to the paper. Next, the yellow filter Y is moved out of the light path 36, leaving the cyan and magenta filters C, M in the light path 36, to produce the color blue. Once again the sensor 100 senses the intensity of the blue light passing through the transparency and produces a signal used for causing an adjustment in the exposure time for the color blue. At the end of the blue exposure the blue color producing filters C, M are held in place until the white light is completely off, or the yellow filter Y is dropped back into the light path with filters C, M to once again shutter out all light until the lamp is completely off. It takes a short interval of time after electrical power to the lamp 38 is stopped until the filaments cool down and the light actually goes off. It is important to block all white light to the photographic paper until there is no more white light.

The operating cycle will now be described again, but this time with reference to FIGS. 8 and 9.

Figure 8:
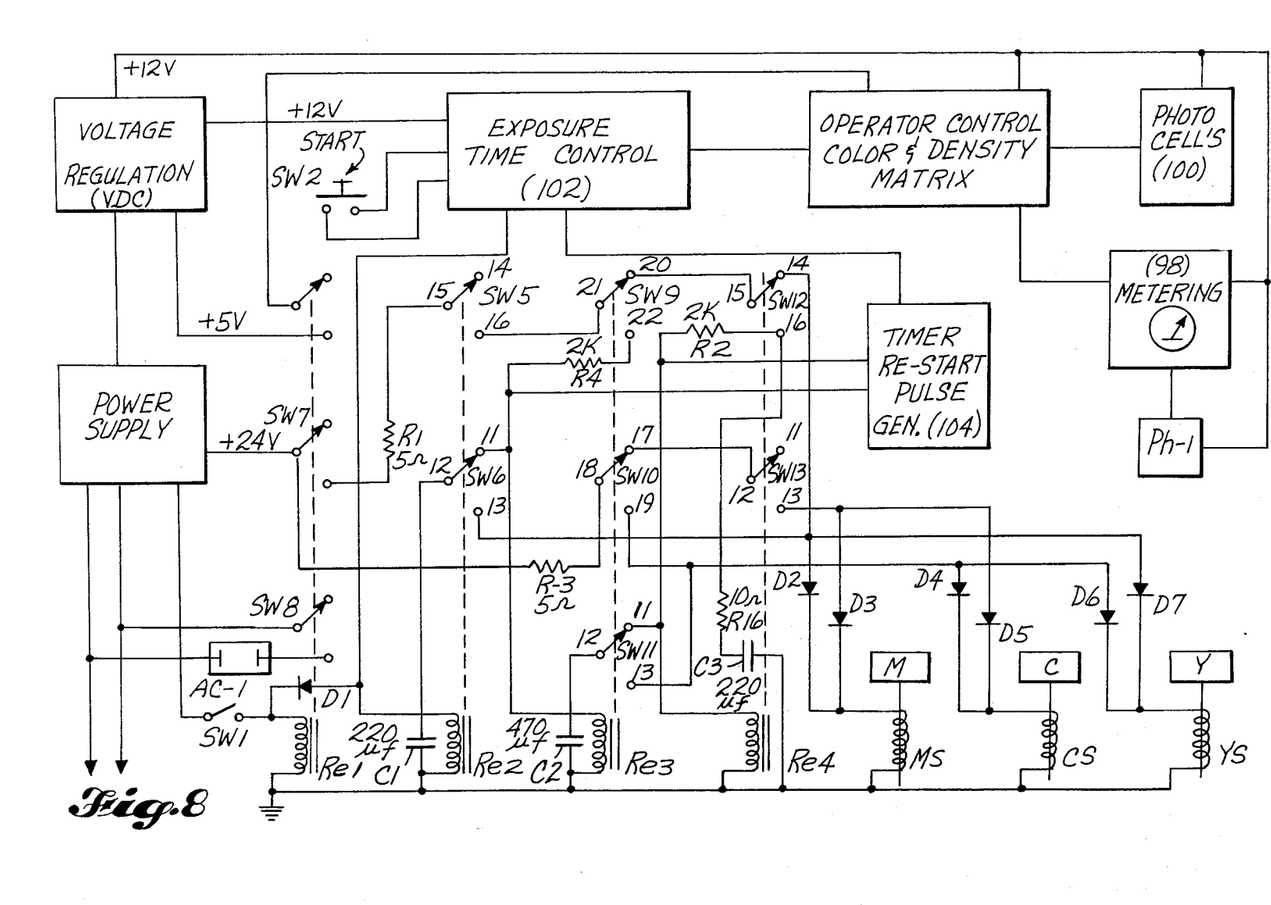
FIG. 8 is an electrical schematic diagram of some of the components of the control circuit.

Referring to FIG. 8, the print button SW-2 is pushed to start the exposure cycle. This starts the timer 102 and also energizes relays Re-1 and Re-2. Relay Re-2 repositions switches SW-3, SW-4, SW-5 and SW-6. Specifically, it opens path 9-8 and closes path 9-10 in switch SW-3. It opens path 6-5 and closes path 6-7 in switch SW-4. It opens path 15-14 and closes path 15-16 in switch SW-5. It opens path 12-11 and closes path 12-13 in SW-6. Relay RE-1 closes switch SW-7, connecting the power supply to path 15-16 of switch SW-5, and closes switch SW-8, to supply power to plug AC-1 into which the lamp 38 is plugged. Power flowing through path 15-16 of switch SW-5 energizes solenoids MS and YS, causing movement of the Y and M filters into the light path 36 to produce the color red.

The power delivered to relay RE-2 also charges capacitor C1. Upon completion of the exposure for the color red timer 102 functions to shut off power to relays RE-1 and RE-2.

Deenerization of relay RE-2 opens path 12-13 and closes path 12-11 in switch SW-6. The charge of capacitor C1 then travels path 12-11 in switch SW-6 and energizes relay RE-3. Relay RE-3 opens path 9-8 and closes path 9-10 in switch SW-7. It opens path 6-5 and closes path 6-7 in switch SW-8. It opens path 21-20 and closes path 21-22 in switch SW-9. It opens path 18-17 and closes path 18-19 in switch SW-10. It also opens path 12-11 and closes path 12-13 in switch SW-11. A portion of the charge from capacitor C1 is transmitted to a timer re-start pulse generator 104, producing a signal which restarts the timer 102, causing relays RE-1 and RE-2 to be energized again. Relays RE-1 and RE-2 function as before. However, since relay RE-3 is now energized, the power flow through switch SW-9 is along path 21-22. Power along this path reaches a holding circuit for the relay RE-3 which includes resistor R4. The operation of relay RE3 on switch SW-10 establishes power flow from the power supply through path 18-19 of switch SW-10 to the solenoids CS and YS, causing movement of the filters C and Y into the light path 36. Power flow through path 18-19 of switch SW-10 and through path 13-12 of switch SW-11 and through path 13-12 of switch SW-11 provides a charge for capacitor C2.

At the conclusion of the green exposure cycle, the timer 102 functions to de-energize relays RE-1, RE-2 and RE-3. Following repositioning of the switches controlled by such relays, the charge of capacitor C2 travels path 12-11 of switch SW-11 and energizes relay Re-4. Some of such charge also provides a new signal to the timer re-start generator 104, causing it to function and re-start the timer 102. The timer 102 transmits power to the relays RE-1 and RE-2, causing them to function as before, but this time while RE-4 is energized. As a result, power supplied along path 15-16 of switch SW-5 in path 21-20 of switch SW-9 travels path 15-16 of switch SW-12 to a holding circuit which includes resistor R2. The repositioning of switch SW-13 by relay RE-4 establishes a path from the power supply through path 18-17 of switch SW-10 and path 12-13 of switch SW-13 to the solenoids MS and CS, moving the magenta and cyan filters M, C into the light path 36, to produce the color blue. At the conclusion of the exposure period for the color blue the timer 102 again functions to shut off power to the relays RE-1 and RE-2. Power supplied through path 15-16 of switch SW-12 also charges capacitor C3. Then when power to relays Re-1 and Re-2 is discontinued, capacitor C3 delivers power to relay Re4, causing it to establish path 12-13 through switch SW-13. This continues power supply to solenoids MS, CS, holding in filters M, C until the filaments of light 38 have cooled and the light is completely off.

During the timing cycle, between the exposure periods for the colors red and green and green and blue, solenoid movement of a filter for a subsequent color moves the filter into place before the filters for the previous color have moved out. This delay of the previous filters results from a delay in time between when a signal reaches the control solenoids until when the solenoids function to actually cause the physical movement. As explained above, at the end of the cycle capacitor C3 acts to hold in relay Re-4 and relay Re-4 functions to keep the M and C filters in the light path until the filament has cooled and the light has turned off. Thus, the exposure time to the color blue is extended somewhat to prevent the paper from being exposed to white light at the end of the cycle.

Figure 9:
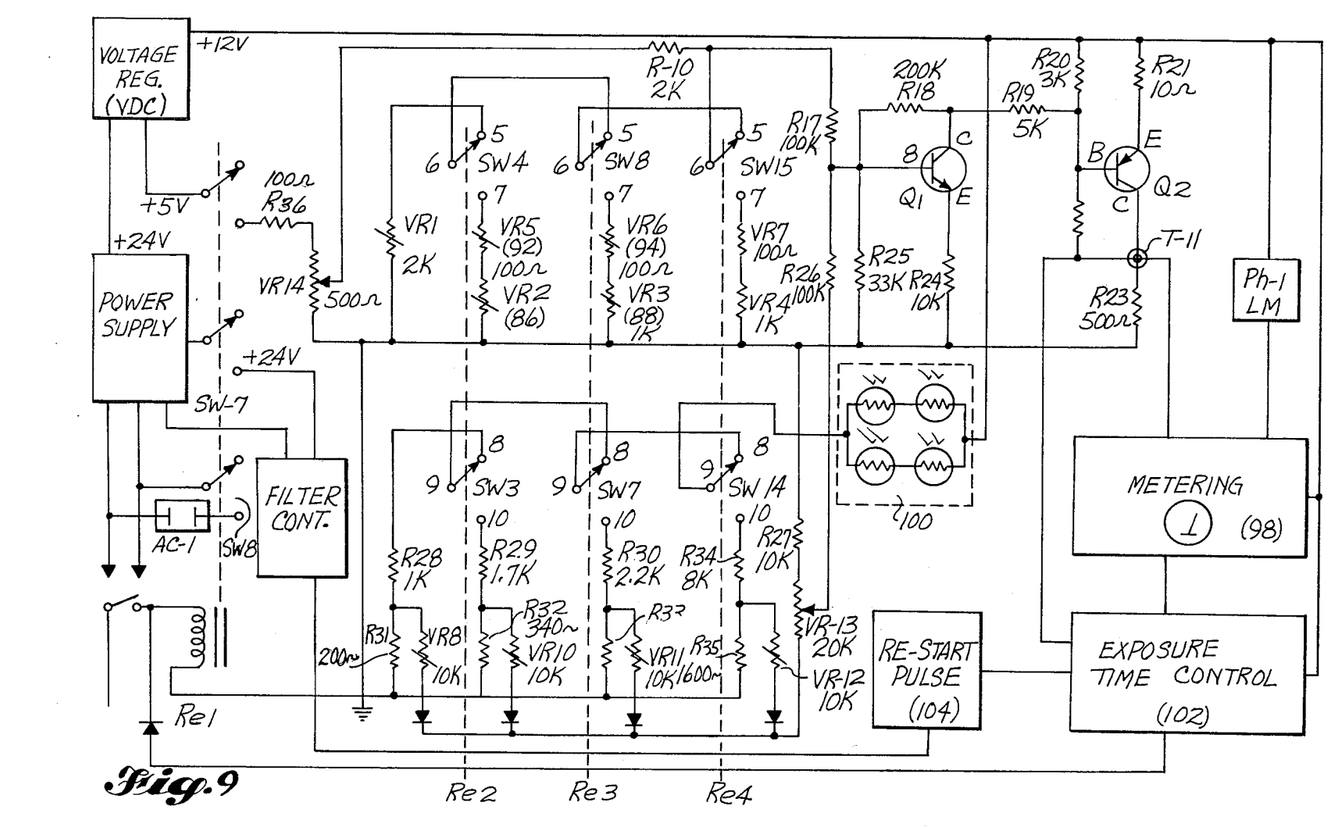
FIG. 9 is an electrical schematic view of some additional components of the control circuit.

Referring to FIG. 9, the operator controlled mechanism for controlling exposure time and density includes variable resistors VR1, VR2, VR3, VR4. Variable resistor VR1 is located in the rear of the control box 32. It is not designed for operator adjustment during use of the system, but rather is initially set by a technician and then left alone. Variable resistor VR1 is provided to establish a desired relationship between light density and the exposure time for the color red.

Variable resistors VR2, VR3 and VR4 are operator controlled, by the control knobs 86, 88, 90 on the control box 32.

Variable resistors VR5, VR6, VR7 provide for fine adjustment and are operator adjusted by use of the control knobs 92, 94, 96.

Variable resistors VR8, VR10, VR11, VR12 are provided for trim purposes. Like density VR1, they are set by a technician and left alone during operation of the system.

Solid state voltage drop chip VDC reduces the line voltage from 24 volts to 12 volts. Voltage drop chip VDC further drops the voltage from 12 volts to 5 volts. Relay positioning of the switches SW-3, SW-7 and SW-14 establishes the base voltage acting on transistor Q1. Light sensor means 100 provides a voltage drop which is proportional to the intensity of the light it receives. The greater the amount of the light, the larger the voltage drop. Current flow path C-E of transistor Q2 is proportional to the voltage drop at base B. That is, the voltage across path C-E of transistor Q2 increases as the voltage at base B increases. An increase in voltage at terminal point T-11 adjusts the timing mechanism to shorten the exposure time.

Sensor means 100 preferably comprises a plurality of sensors which are evenly spaced about the lens. As shown in FIG. 9, the individual sensors are arranged so that the output of the sensor means is an average of each of the individual sensors. The system would work with only one sensor. However, it would be positioned adjacent only a small portion of the projected light and the signal picked up by it would not be representative of the entire transparency if it senses light coming from a portion of the transparency which is either lighter or darker than the transparency as a whole.

Figure 10:
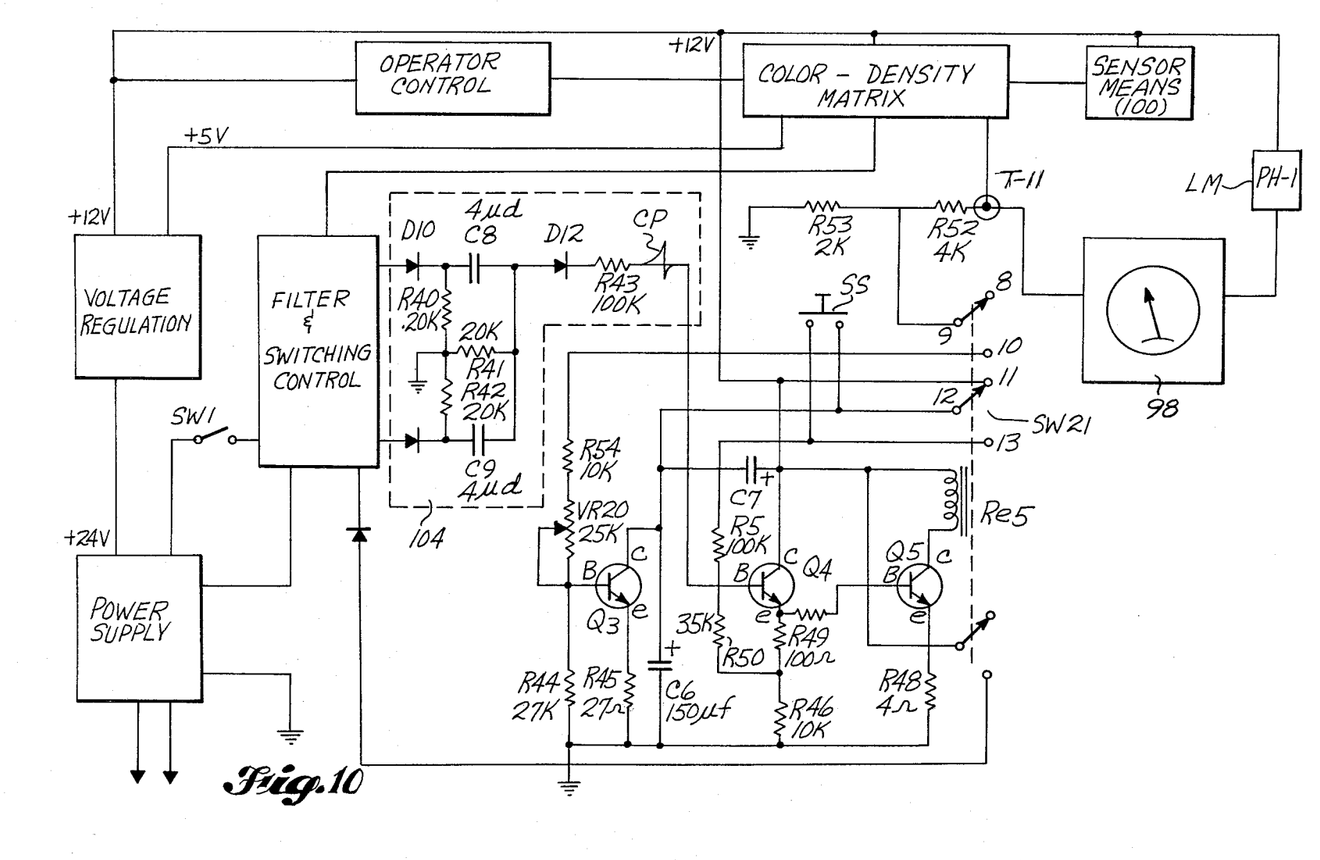
FIG. 10 is an electrical schematic view of the timer re-start pulse generator and exposure time control portions of the control circuit.

Referring to FIG. 10, power from the twelve volt line travels path 11-12 of switch SW-21 and charges capacitor C6 and also discharges capacitor C7. Operation of the start button SS connects power to the base of transistor Q4, causing transistor Q4 to transmit and deliver power to the base of Q5. This causes transistor Q5 to transmit, resulting in energization of relay RE-5. Energization of relay RE-5 results in power transmission along path 9-10 of switch SW-20 and path 12-13 of switch SW-21. Power through path 12-13 of switch SW-21 maintains voltage at the base of transistor Q4, locking it into operation as long as there is a charge on capacitor C6. The time of this charge is determined by the signal from the color-density matrix through path 9-10 of switch SW-20. Power delivered through path 9-10 of switch 20 to the base of transistor Q3 causes transistor Q3 to conduct, resulting in a discharge of both capacitor C6 and capacitor C7. The discharging of capacitor C6 functions to de-energize relay RE-5.

The timer re-start pulse generator 104 is of two part construction, with either part being able to deliver a charging pulse CP.

Sensor means 100 may comprise a plurality (e.g. four) of cadmium sulfide photo cells. These are light sensitive resistors. In the preferred embodiment four CL705L type cadmium sulfide photo cells are used in a group, as pictured, to provide an average signal.

The control circuitry for the second and third channels may be like the control circuitry that has been illustrated and described. A conventional gang switch could be used for selecting the particular channel or program which is to be combined with the rest of the circuitry.

The foregoing detailed description of one embodiment of the invention has been set forth solely to provide a complete teaching of the invention not with the intent to limit the scope of the invention. If any modifications to the foregoing embodiment, of a type which do not depart from the spirit and scope of the invention, will occur to persons familiar with the art. Accordingly, the scope of the invention is not to be limited by the detailed description of a preferred embodiment, but rather by the following claims.

What is claimed is:

1. An exposure system for a color enlarger, comprising:
   three separate color filters mounted to be independently movable into and outfrom the light path between a lamp and a supported color transparency in a color enlarger;
   control means for sequencing said filters into and outfrom the light path to provide three separate exposures for the colors red, green and blue, including means providing an exposure time for each color exposure that is based on the color density of a standardized transparency, and balance means for adjusting the exposure time for each color exposure to compensate for differences in color density between the standardized transparency and a transparency in the color enlarger from which a color print is to be made including light intensity sensor means in the enlarger between the transparency and the lens, for measuring during each exposure the intensity of colored light passing through the transparency.

2. An exposure system according to claim 1, wherein said balance means comprises means responsive to a sensed difference in color density between the standard transparency and the transparency in the enlarger, for automatically adjusting the time period for each exposure to improve color balance.

3. An exposure system according to claim 1, wherein said control means comprises a separate electrically operated actuator means for each filter, for moving the filters into and outfrom the light path.

4. An exposure system according to claim 1, wherein the means for providing an exposure time for each color exposure based on the color density of a standardized transparency includes an operator setable timer mechanism.

5. An exposure system according to claim 1, wherein the control means includes actuator means for moving each filter into and outfrom the white light path and each actuator means includes an electrical solenoid.

6. An exposure system according to claim 1, wherein said means for providing an exposure time for each color exposure that is based on the color density of a standardized transparency includes voltage controlled electronic timer means having an operator setable variable resistor means for a voltage signal to in that manner change the exposure time for a color, and said balance means includes light signal controlled variable resistor means for changing the voltage signal to the electronic timer means, wherein the light intensity sensor means in the enlarger between the transparency and the lens provides the light signal.

7. An exposure system according to claim 6, wherein the light intensity sensor means comprises a plurality of photo electric sensors spaced about the lens and interconnected to provide an average signal.

8. An exposure system according to claim 1, wherein each color filter includes a filter carrier mounted for reciprocal movement between an "in" position in which its filter is within the white light path and an "out" position in which its filter is out of the white light path, and wherein the control means includes a separate actuator means for moving each filter carrier between its "in" and "out" positions, each said actuator means including an electrical solenoid and a swingable control arm operably connected to the solenoid at one of its ends and to its filter carrier at its opposite end, with solenoid operation serving to swing the control arm in position to cause it to in turn move its filter carrier from its "out" position into its "in" position.

9. An exposure system according to claim 8, wherein the control rod for one of the filter carriers includes a first arm means which extends over an adjacent control rod for a second filter carrier and is spaced from it when the filter carriers are in there "out" positions, but is so positioned that following a partial movement of the first control rod the arm means will make contact with the second control rod, and the second control rod will move with the first control rod throughout the remaining part of its movement.

10. An exposure system according to claim 1, for a color enlarger of a type having a head comprising a housing, a horizontally directed lamp within said enlarger head housing, a reflector within said enlarger head housing positioned to receive light from the lamp and direct it vertically downwardly, a transparency holder carried by said enlarger head housing, below the reflector and within the path of reflected light from the reflector, an enlarging lens positioned below the transparency holder, and bellows means interconnected between the lens and said enlarger head housing, wherein said enlarger head housing includes an openable lid structure which when opened provides access to the interior of said enlarger head housing through the top of the enlarger head housing, and wherein the exposure system includes a filter assembly attachment comprising a carrier housing for the three color filters which is positionable on said enlarger head housing when the top of said enlarger head housing is open, said filters depending from said carrier housing down into the enlarger head housing, in a position therein for movement into and outfrom the light path.

11. An exposure system for a color enlarger, comprising:
three separate color filters mounted to be independently movable into and outfrom the light path between a lamp and a supported color transparency in a color enlarger;
control means for sequencing said filters into and outfrom the light path to provide three separate exposures for the colors red, green and blue, including means providing an exposure time for each color exposure that is based on the color density of a standardized transparency, and balance means for adjusting the exposure time for each color exposure to compensate for differences in color density between the standardized transparency and a transparency in the color enlarger from which a color print is to be made, wherein the contol means for the filters includes means for holding a combination of filters in the light path between color exposures and at the end of a cycle, to prevent white light from the lamp from reaching the transparency.

12. An exposure system, for a color enlarger, comprising:
three separate color filters mounted to be independently movable into and outfrom the light path between a lamp and a supported color transparency in a color enlarger;
control means for sequencing said filters into and outfrom the light path to provide three separate exposures for the colors red, green and blue, including means providing an exposure time for each color exposure that is based on the color density of a standardized transparency, and balance means for adjusting the exposure time for each color exposure to compensate for differences in color density between the standardized transparency and a transparency in the color enlarger from which a color print is to be made; and
wherein the color filters are subtractive filters and comprise the colors yellow, magenta and cyan, and said control means includes means for establishing the magenta and yellow filters together into the white light path to produce the color red, followed by an establishment of the yellow and cyan filters together into the white light path to produce the color green, followed by establishment of the cyan and magenta filters together into the white light path to produce the color blue.

13. An exposure system according to claim 12, wherein the control means comprises means for moving the magenta and yellow filters together into the white light path to produce the color red, followed by movement of the cyan filter into the white light path, followed by movement of the magenta filter outfrom the white light path, leaving the yellow and cyan filters together in the light path to produce the color green, followed by movement of the magenta filter back into the white light path, followed by movement of the yellow filter outfrom the white light path, leaving the cyan and magenta filters in the white light path to produce the color blue.

14. An exposure system according to claim 13, wherein the control means further includes means for delaying the yellow and cyan filters in the white light path following the exposure time for the color blue, until the filaments of the lamp have had a chance to cool and all white light has disappeared.

15. An exposure system according to claim 12, wherein the control means further comprises means for moving the magenta filter part way into the light path while the yellow and cyan filters are together in the white light path to produce the color green, so that the portion of the magenta filter that is in the white light path will, together with the portions of the yellow and cyan filters with which it is aligned, completely block off a portion of the white light, to in that manner decrease the amount of light from the lamp that is utilized to produce the color green, so that the exposure time for the color green can be increased.

16. An exposure system according to claim 15, wherein the means for moving the magenta filter part way into the white light path comprises mechanical means operable upon movement of the cyan filter all the way into the white light path.

17. An exposure system according to claim 12, wherein the control means further comprises means for moving the yellow filter part way into the light path while the magenta and cyan filters are together in the white light path to produce the color blue, so that the portion of the yellow filter that is in the white light path will, together with the portions of the magenta and cyan filters with which it is aligned, completely block off a portion of the white light, to in that manner decrease the amount of light form the lamp that is utilized to produce the color blue so that the exposure time for the color blue can be increased.

18. An exposure system according to claim 17, wherein means for moving the yellow filter part way into the white light path comprises mechanical means operable upon movement of the cyan filter all the way into the white light path.

19. An exposure system attachment for a color enlarger of a type having a head comprising a housing, a horizontally directed lamp within said enlarger head housing, a reflector within said enlarger head housing positioned to receive light from the lamp and direct it vertically downwardly, a transparency holder carried by said enlarger head housing, below the reflector and within the path of reflected light from the reflector, an enlarging lens positioned below the transparency holder, and bellows means interconnected between the lens and said enlarger head housing, wherein said enlarger head housing includes an openable lid structure which when open provides access to the interior of said enlarger head housing through the top of the enlarger head housing, said system comprising:

a filter assembly and a carrier housing for the filter assembly which is positionable on said enlarger head housing when the top of said enlarger head housing is open, said filter assembly comprising three separate filters occupying parallel vertical planes, a vertically movable carrier for each filter, and actuator means within said carrier housing for moving the filter carriers and the filters carried thereby vertically into and outfrom the light path between the lamp and the reflector, said filter carriers extending downwardly from said carrier housing into the enlarger head housing and said filters being located at the lower ends of said filter carriers.

20. An exposure system according to claim 19, wherein the actuator means comprises an electrical sollenoid for each filter and mechanical control linkage between each sollenoid and each filter carrier.

21. An exposure system for a color enlarger of a type having a head comprising a housing, a horizontally directed lamp within said housing, a reflector within said housing positioned to receive light from the lamp and direct it vertically downwardly, a transparency holder carried by said housing, below the reflector and within the path of reflected light from the reflector, an enlarging lens positioned below the transparency holder, and bellows means interconnected between the lens and said housing, wherein said housing includes an openable lid structure which when open provides access to the interior of said housing through the top of the housing, said system comprising:

a filter assembly and a carrier for the filter assembly which is positionable on said housing when the top of said housing is open, said filter assembly comprising three separate filters occupying parallel vertical planes, vertically movable carrier structure for each filter, and actuator means for moving the filter carriers and the filters carried thereby into and outfrom the light path between the lamp and the reflector; wherein the actuator means comprises an electrical solenoid for each filter and mechanical control linkage between each solenoid and each filter carrier; and wherein each solenoid includes a piston and the mechanical linkage includes lever arm means attached to the piston and operable to push a filter carrier and the filter carried thereby into the light path upon energization of the solenoid.

22. An exposure system according to claim 21, wherein the lever arm means for one of the filters carries a push member which extends over an adjacent lever arm means and is spaced a distance therefrom, so that the first lever arm means can move a distance equal to such spacing until such push arm means makes contact with the set adjacent lever arm means, and then solenoid movement of the first lever arm means will cause the adjacent lever arm means to move with it, for the remainder of its travel, whereby said adjacent lever arm means will push its filter carrier downwardly to the extent that it moves, to place its filter partially within the light path from the lamp to the mirror.

23. A method of exposing print paper in a color enlarger, comprising:

sequencing yellow, magenta and cyan filters into and out from the light path between the lamp of the enlarger and a supported color transparency in the enlarger, to provide three separate exposures for the colors red, green and blue;

measuring the color density of the transparency in the enlarger by the use of light intensity sensor means positioned in the enlarger between the transparency and the lens to produce a signal; and controlling the exposure time for each exposure as a function of the color density signal.

24. In an exposure system for a color enlarger, a method of decreasing light intensity during a color exposure, comprising positioning a selected pair of subtractive filters colored yellow, cyan and magenta in a white light path between a lamp and a supported transparency in a color enlarger, to color the light, positioning the third said subtractive filter a predetermined part way into the white light path, so that such portion of the third filter and the portions of the other two filters with which it is aligned in the white light path will function together to block off a predetermined portion of the white light, and maintaining such filters in the white light path for a predetermined time, for establishing a color exposure.

* * * * *